Patented June 18, 1946

2,402,495

UNITED STATES PATENT OFFICE 2,402,495

CAPILLARY ACTIVE SALTS

Vernon E. Haury, El Cerrito, and Seaver A. Ballard, Oakland, Calif., assignors to Shell Development Company, San Francisco, Calif., a corporation of Delaware No Drawing. Application October 9, 1942,
Serial No. 461,646

12 Claims. (Cl. 260—404)

This invention relates to a new class of organic compounds which are capillary-active agents possessing valuable wetting, foaming, emulsifying and related properties. More particularly the invention relates to addition compounds formed between higher molecular weight fatty acids and amino alcohols or amino ketones such as, for example, diacetone amine oleate, diacetone alkamine oleate and diacetone alkamine stearate.

It is an object of the invention to provide a new class of capillary-active agents which may be economically produced from inexpensive and available material. A further object is to provide new and useful capillary-active agents of the anion-active type. A still further object is to provide superior capillary-active agents useful in the textile industry. Additional objects will be apparent in the following description.

Wetting agents have a wide application in industry and are used extensively in the dyeing and mercerizing of textiles and in the preparation of such substances as inks, insecticides, detergents, etc. The function of wetting agents is to assist the rapid and uniform penetration of solutions into materials such as fibres and fabrics, and the rapid, uniform wetting of otherwise difficultly wettable materials. The presence of a relatively small amount (about 0.1%) of a good wetting agent in a solution is generally sufficient to obtain the desired result. Various types of substances that have been suggested in the past as wetting agents are such compounds as sulfonated oils, sulfonated high molecular weight alcohols, metallic soaps, substituted imido alkylols, etc. Wetting agents should be of such a character as not to act unfavorably upon the solutions used for treatment or upon the material being treated by the solution. They should also perform their function as wetting agents without the necessity of subjecting the material treated to a preliminary treatment such as cleaning.

It has now been found, according to the present invention, that the condensation products of $\alpha\beta$ unsaturated aldehydes and ketones with ammonia, such as described, for example, in "Richter's Organic Chemistry" by Percy E. Spielmann, volume I, second edition, page 230, form excellent capillary active agents, of the type herein described, when associated with organic soap-forming compounds, such as, for example, higher fatty acids. The amino ketones resulting from the condensation as well as the corresponding amino alcohols, may be used to form addition compounds with a suitable fatty acid. A particular advantage of these capillary-active substances is that they are easily formed from readily available materials. Thus an unsaturated ketone, for example methyl vinyl ketone, may be condensed with ammonia to yield methyl, amino ethyl ketone which may be hydrogenated to 1- amino, 3-hydroxy butane. Or an $\alpha\beta$ unsaturated aldehyde, for example crotonaldehyde, may similarly be condensed with ammonia to produce $\beta$ amino butylaldehyde which may be hydrogenated to 3-amino, butanol-1. Or a ketone, aldehyde and ammonia may be condensed together, for example acetone, acetaldehyde and ammonia (the acetone and acetaldehyde forming an $\alpha\beta$ unsaturated ketone with which the ammonia reacts) to yield methyl, $\beta$ amino propyl ketone which may then, if desired, be hydrogenated to 2-amino, 4-hydroxy pentane.

Again, readily obtainable ketones may be condensed together with the aid of acid or basic catalysts to yield ketols which on dehydration produce unsaturated higher molecular weight ketones. For example, mesityl oxide is thus obtained from two molecules of acetone, homomesityl oxide from the condensation and dehydration of two molecules of methyl ethyl ketone, seven carbon atom unsaturated ketones from the inter-condensation and simultaneous or subsequent dehydration of acetone and methyl ethyl ketone, etc. Such $\alpha\beta$ unsaturated ketones may be reacted with ammonia or the original two molecules of saturated ketones may be condensed in the presence of ammonia to yield amino ketones of the general formula

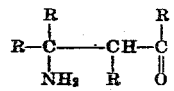

in which R represents the same or different alkyl radical. Instead of having the open chain structure shown in the formula, the amino ketones may be carbocyclic compounds such as 3-amino, 3,5,5-trimethyl cyclohexanone.

These compounds may then be used as capillary-active agents in conjunction with the desired fatty acid or the carbonylic group may first be reduced or hydrogenated to produce the corresponding hydroxy amines which may be similarly employed as wetting agents and the like. The alkyl radicals of these amino compounds may also, if desired, be substituted by any suitable atom or radical such as a halogen atom, hydroxy radical, an additional amino radical, etc. It will be observed that in all of the instances the primary amino radical is attached to a carbon atom which is separated by another carbon atom from the

or

group. The amino radical may also have one or more of its hydrogen atoms substituted by alkyl or other radicals.

It has now been found that the higher fatty acid salts of the above-defined amino compounds possess excellent foaming, wetting and emulsifying properties, in some instances being greatly superior to the salts of ethanolamines and other commonly used capillary-active agents. The amino salts which are the preferred subjects of the present invention are those formed by the simple addition (usually in equal molecular proportions) of fatty acids to the amino nitrogen atom of the designated amino ketone or amino alcohol, without the splitting out of any component. The two compounds need only be brought together in the liquid phase to effect this combination, the addition salt then acting as an anion-active capillary agent in aqueous media. This addition reaction may be effected at room or elevated temperatures and in the presence or absence of a solvent such as diethyl ether. The salts thus prepared may be added directly to the wetting solution. Or if desired, the fatty acid and amino compound may be added to the aqueous media in any satisfactory manner together or separately.

The salts of the present invention may be used, for instance, in treating baths containing an aqueous medium, with or without an additional substance, such as, for example, mordants, dyes, color discharging reagents, hydrogen peroxide, color reducing agents, and other reagents or substances commonly used in treating baths, and the treating bath so formed may be employed with improved results in many of the arts in which interface modification or wetting-out action is desired. For example, dyeing, bleaching, scouring, and otherwise treating fabrics and fibers and other materials in the treatment baths of this character are productive of excellent results. Also, in the stuffing of leather, dyeing and otherwise treating furs and in many other arts, a treating bath employing the materials of this invention may be used. In the flotation of ores, these amino compounds may be used with or without other reagents to modify the interface between the finely divided ore and the aqueous medium. The products of the invention may also be employed with effective results in cosmetic preparations such as cold creams, vanishing creams, lipsticks, skin lotions, and shaving creams of all types.

One test of the comparative foaming properties of these new amino salts and some hitherto accepted capillary active agents was made in the following manner:

Fifty ml. of the solution were placed in a 120 ml. graduated mixing cylinder, shaken for one minute in a mechanical shaker and then placed in a 25° C. thermostatically-controlled oven. Readings of the liquid volume were made every minute for thirty minutes. The foaming power is taken as the average volume of the liquid, expressed in per cent, existing as foam during the first three minutes. The foam stability is the average volume of the liquid, expressed in per cent, existing as foam during the last ten minutes of the test.

One tenth per cent solutions of the following amine stearates were tested by the above procedure. The stearic acid was melted and the theoretical amount of the amine was added to it with stirring. The results are shown in the following table:

*Foam tests of 0.1% aqueous solutions of amine stearates*

| Amine | Foaming power | Foam stability |
|---|---|---|
|  | Per cent | Per cent |
| Diacetonealkamine $(CH_3)_2C(NH_2).CH_2CH(OH)CH_3$ | 37.3 | 6.5 |
| Monoethanolamine | 3.1 | 2.2 |
| Diethanolamine | 2.9 | 2.5 |
| Triethanolamine | 0.2 | 0 |
| Morpholine | 0.2 | 0 |

One tenth per cent aqueous solutions of the oleates of a number of these amines showed somewhat less foaming ability. However, the oleate of diacetonealkamine with a foaming power of 6.8% and a foam stability of 2.4% was still superior to the foaming power of 2-amino-2-methyl-1 propanol oleate (2.8%), to the foam stability of morpholine oleate (2.0%) and of diethanolamine oleate (<0.1%).

Although some of these new amine stearates are better foaming agents than the corresponding oleates, it has also been found that some of the new amine oleates have superior wetting ability to the corresponding stearates.

Wetting properties were determined by means of the Draves test (American Dyestuff Reporter, 28, 425–428). Grey (unbleached) cotton yarn was wound in a skein 18 inches long weighing 5.0 grams. The skein was folded once, the ends of the loop were cut, a hook of a standard weight to which a lead sinker was attached by a thread was hung at the center of the fold and the whole assembly was dropped into a glass cylinder containing enough test solution to cover the skein completely. The sinking time is the time measured from the instant the skein is dropped into the solution to the instant the skein starts to sink.

The superior wetting ability of diacetonealkamine soaps may be seen from the following comparisons:

*Results of Draves test of various wetting agents*

(Temp.=25° C.; wt. of skein=5.0 g.)

| Material | Wetting time in seconds for given concentration in g./l | | | | | | | Weight of hook, g. |
|---|---|---|---|---|---|---|---|---|
| Concentration, g./l | 5.0 | 2.5 | 1.0 | 0.7 | 0.5 | 0.25 | 0.125 |  |
| Diacetonealkamine oleate | 2.7 | 3.5 | 9.0 | 21.7 | 41.4 | | | 3.0 |
| 2-amino-2-methyl-1-propanol oleate | 2.9 | 4.0 | 12.3 | | 76.7 | | | 3.0 |
| Diethanolamine oleate | 4.6 | 7.4 | 25.2 | | | | | 3.0 |
| Monoethanolamine oleate | 4.6 | 9.1 | 21.9 | | | | | 3.0 |
| Morpholine oleate | 7.7 | 19.6 | 73.2 | | | | | 3.0 |
| Triethanolamine oleate | 10.4 | 19.9 | 77.3 | | | | | 3.0 |
| Diacetonealkamine oleate | | | | | 4.5 | 32.1 | 153.3 | 6.0 |
| 2-amino-2-methyl-1-propanol oleate | | | | | 5.4 | 37.5 | 169.4 | 6.0 |
| Diacetonealkamine stearate | | | 5.0 | | | | | 9.0 |
| Diethanolamine stearate | | | 24.2 | | | | | 9.0 |
| Morpholine stearate | | | 62.1 | | | | | 9.0 |

The emulsification properties of the amine soaps were determined by shaking 50 ml. of the soap solution with 50 ml. of Maxim oil No. 13 in a 100 ml. graduated mixing cylinder in a mechanical shaker for one minute, placing the cylinder in a constant temperature bath, then recording the volume of the upper phase every five minutes for one hour. Usually only a water phase separated out of the emulsion, hence the upper phase was taken as the volume of the emulsion.

The emulsion produced by a five per cent solution of diacetonealkamine oleate was entirely stable after an hour, a 2½% solution was about 88% stable and a 1% solution was about 68% stable after the same period. In this respect the diacetonealkamine oleate is superior to 2-amino-2-ethyl-1,3-propanediol oleate, to morpholine oleate, to diethanolamine oleate and to butadiensulfoneamine oleate.

The term "higher fatty acids" which may combine with the amines of the present invention is used to designate any saturated or unsaturated fatty acid which has a minimum of eight carbon atoms such as caprylic, nonylic, capric, undecylic, lauric, tridecoic, myristic, pentadecoic, palmitic, margaric, stearic, nondecoic, arachidic, henecosoic, behenic, tricosoic, lignoceric, pentacosoic, cerotic, carbocenic, octacosoic, montanic, melissic, myricinic, psyllaic, psyllostearic, oleic and the like. Those fatty acids which contain a minimum of twelve carbon atoms constitute a preferred group, those containing from sixteen to twenty or more carbon atoms being particularly effective.

Among other uses the salts of the present invention are of great value for aqueous treatments of all kinds, and in particular in the wetting, cleansing, sizing, de-electrification, prevention of acid fading of dyestuffs, creping and other treatments of textile filaments, threads, yarns, fabrics and the like and also in the dispersion, emulsification and wetting of difficultly wettable or water-insoluble substances and materials of all kinds. The dispersions and emulsions so produced are particularly suitable for the dyeing or other treatments of textile materials.

We claim as our invention:

1. The addition salt of a higher fatty acid with an amino alcohol, which alcohol is characterized by an amino group attached to a tertiary carbon atom at least once removed from a secondary carbon atom having a hydroxyl group directly attached thereto.

2. The addition salt of a higher fatty acid with an amino alcohol, which alcohol is characterized by a primary amino group attached to a tertiary carbon atom at least once removed from a secondary carbon atom having a hydroxyl group directly attached thereto.

3. The addition salt of a higher fatty acid with an amino alcohol, which alcohol is characterized by an amino group attached to a carbon atom once removed from another carbon atom having a hydroxyl group directly attached thereto.

4. The addition salt of a higher fatty acid and 1-amino,3-hydroxy butane.

5. The addition salt of a higher fatty acid and 2-amino,4-hydroxy pentane.

6. The addition salt of stearic acid and 2-amino,4-hydroxy pentane.

7. The addition salt of oleic acid and 1-amino,3-hydroxy butane.

8. The addition salt of a higher fatty acid with an amino alcohol having an amino group attached to a non-primary carbon atom at least once removed from a secondary carbon atom having a hydroxyl group directly attached thereto.

9. The addition salt of stearic acid with an amino alcohol having an amino group attached to a tertiary carbon atom at least once removed from a secondary carbon atom having a hydroxyl group directly attached thereto.

10. Diacetonealkamine stearate.

11. A capillary active, water soluble material comprising a diacetonealkamine salt of a fatty acid containing from 12 to 20 carbon atoms.

12. A diacetonealkamine salt of a higher fatty acid.

VERNON E. HAURY.
SEAVER A. BALLARD.